United States Patent [19]

Lynk et al.

[11] Patent Number: 4,967,407
[45] Date of Patent: Oct. 30, 1990

[54] CONTINUOUS TRANSMISSION MODE RADIO WITH CONTROL INFORMATION MONITORING CAPABILITY

[75] Inventors: Charles N. Lynk, Bedford; Joseph P. Heck, Fort Worth, both of Tex.

[73] Assignee: Motorola, Inc., Schaumburg, Ill.

[21] Appl. No.: 300,518

[22] Filed: Jan. 23, 1989

[51] Int. Cl.$^5$ ............................................. H04J 4/00
[52] U.S. Cl. ....................................... 370/50; 370/110.1
[58] Field of Search .................. 455/58, 102, 68, 88, 455/166, 70, 67, 71, 72, 226, 34, 33, 54, 53; 370/31, 24, 110.1, 111, 109; 379/59, 60, 63

[56] References Cited

U.S. PATENT DOCUMENTS

| | | | |
|---|---|---|---|
| 4,420,831 | 12/1983 | Hackett | 370/100.1 |
| 4,498,194 | 2/1985 | Vandegraaf | 455/166 |
| 4,573,210 | 2/1986 | Heck | 455/166 |
| 4,716,407 | 12/1987 | Borras et al. | 455/32 |

*Primary Examiner*—Douglas W. Olms
*Assistant Examiner*—Melvin Marcelo
*Attorney, Agent, or Firm*—Steven G. Parmalee

[57] ABSTRACT

In a communication system where outbound communications are comprised of a TDM format, and inbound communications are not, and wherein the outbound communications occasionally include system control information, a method for allowing a transmitting unit to occasionally interrupt its transmissions to allow reception of system control information.

2 Claims, 2 Drawing Sheets

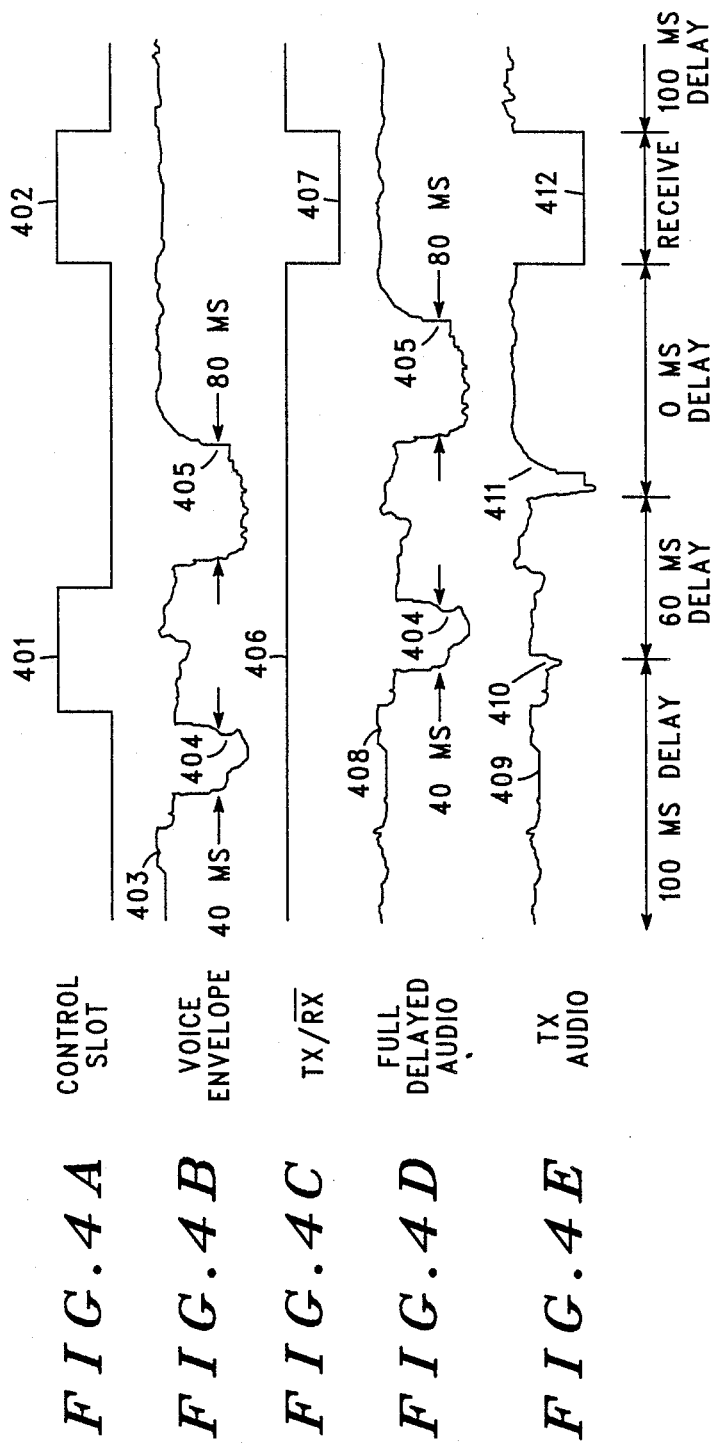

CONTINUOUS TRANSMISSION MODE RADIO WITH CONTROL INFORMATION MONITORING CAPABILITY

TECHNICAL FIELD

This invention relates generally to RF communication systems, and particularly to time division multiplex (TDM) systems that provide system control information.

BACKGROUND ART

Trunked RF communication systems are known in the art. Such systems operate by allocating a limited number of frequency resources amongst a number of communication units (as used herein, "communication units" refers to two-way radios, including mobile radios, portable radios, and fixed location radios). To facilitate this allocation, such systems typically provide system control information, either in a dedicated control channel or control slot, or in a distributed manner, by including the control information subaudibly with message information such as voice signals.

In some applications, system resources are best utilized when a communication unit has the capability of monitoring system control information at all times. Such capability allows a communication unit to respond quickly to changing resource needs or other situations. In a communication system where messages are transmitted from a central to the communication units via a TDM format, and where communications from the communication units to the cental are in the form of continuous transmission signals, such capability is difficult to provide in a cost effective and satisfactory manner.

SUMMARY OF THE INVENTION

The invention functions, in this embodiment, in an RF communication system that includes at least a first station, such as a fixed base, and a second station, such as a communication unit, wherein the first station transmits information, including both message information and system control information, to the second station in as TDM format, and wherein the second station transmits information to the first station in a non TDM format, such as a continuous transmission signal (for example, standard FM). When operating in a transmit mode, the second station can monitor system control information transmitted by the first station by interrupting its own transmission activity from time to time and receiving system control information transmitted by the first station during these interruptions.

In one embodiment, the second station delays final processing of its message transmissions, while simultaneously monitoring its message information to detect the occasional occurrence of predetermined message information events, such as natural nulls that occur during typical voice communications (i.e., natural pauses between words, syllables, sentences, and the like). Some of these detected nulls are then removed from the message signal as finally transmitted to provide time for the radio to occasionally interrupt its transmission mode without losing any of the message information. Such interruptions of the transmission mode allow the radio to receive system control information then being transmitted to the radio.

BRIEF DESCRIPTION OF THE DRAWINGS

FIGS. 4(A-E) comprises a timing diagram depicting operation of the invention.

DESCRIPTION OF THE PREFERRED EMBODIMENT

Figure 1:
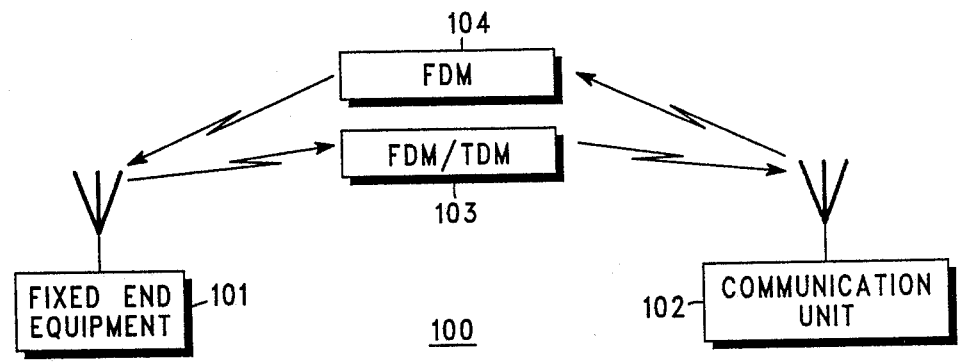
FIG. 1 comprises a block diagram depiction of the system.

Referring to FIG. 1, the system (100) includes fixed end equipment (101) such as a trunking central and associated repeaters, as understood in the art. The system (100) also includes a plurality of communication units (102) (only one is depicted here). Outbound communications (103) from the fixed end (101) to the communication units (102) are configured in a TDM format. In addition, for purposes of this explanation, it will also be presumed that the fixed end (101) has a plurality of frequency resources, and therefore outbound messages are also frequency division multiplexed. Inbound transmissions (104) from the communication units (102) to the fixed end (101) are frequency division multiplex only, and may be, for example, a continuous transmission type of signal such as standard FM.

Figure 2:
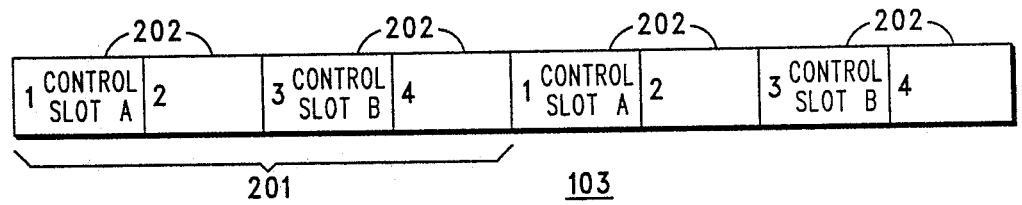
FIG. 2 comprises a diagrammatic representation of the TDM format of outbound communications.

FIG. 2 depicts the frame and slot format for outbound messages (103). It may be presumed that each frequency resource is divided into time frames (201), and that each frame (201) is subdivided into four slots (202). It will also be presumed that two of the slots (202) in each frame (201) of a single frequency resource are control slots (A and B) that carry system control information, such as frequency and slot assignments for communication units (102). (Additional information regarding such a multiple control slot FDM/TDM configuration can be found in copending U.S. Ser. No. 071,300,392 now U.S. Pat. No. 4,492,570, entitled Multiple Control Slot TDM/FDM Communication System, filed on even date herewith and being owned by the same assignee hereof.) Voice information can be supported in the remaining time slots depicted. In addition, of course, other frequencies available for use in the systems (100) could support other slots, or these two control slots could bse divided between two frequency resources, so long as there are two control slots per frame window. (It should be understood that two control slots are depicted in this embodiment for purposes of explanation only; the benefits of the invention could be realized in a single control slot system as well.)

Figure 3:
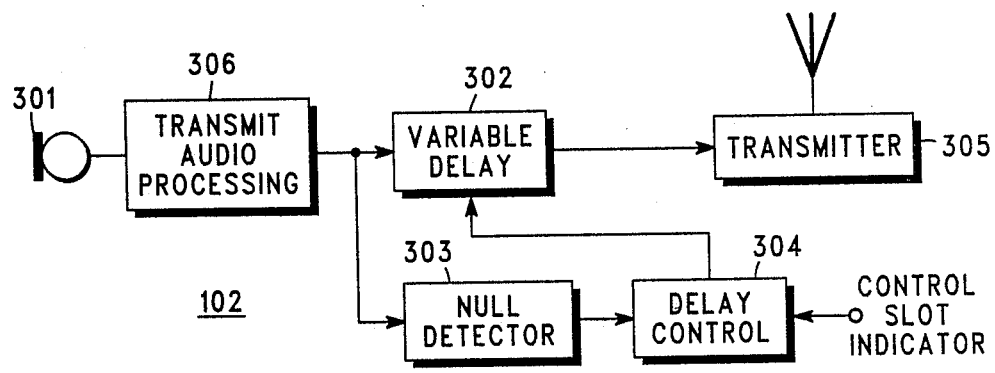
FIG. 3 comprises a block diagram depiction of a communication unit.

With reference to FIG. 3, a communication unit (102) includes generally a microphone (301) for receiving audible voice signals from a user. The microphone (301) transduces these audible voice signals in a known manner to create electric signals representative of the voice signals, which signals are then processed in a transmit audio processing unit (306) as appropriate (for example, these signals may be pre-emphasized, limited, or filtered as appropriate and in a mannner well understood in the art). These signals are provided to both a variable delay (302) and to a null detector (303). The variable delay (302) could be comprised, for example, of a series of tapped delay units, with the output being determined by appropriate selection of one of the delay taps. The null detector (303) could be comprised of any of a number of known and well understood null detectors.

When the null detector (303) detects nulls, signals indicative of this detection are provided to a delay control (304). Provided with both information regarding the existence and duration of nulls in the voice signal, and of the impending occurrence of control slot transmissions from the fix end equipment (102), the delay control provides signals to the variable delay unit (302) to control the actual delay of the voice signal. The audio output of the variable delay (302) is of course coupled to an appropriate transmitter.

Referring to FIG. 4, a more detailed description of the operation of the invention will be provided.

The envelope signal representing the original voice input is set forth in FIG. 4B. Such a signal will have occasional nulls. In this case, for the purpose of explanation, it is presumed that the voice envelope signal (403) has a first null (404) having a duration of 40 ms. and a second null (405) having a duration of 80 ms. For purposes of comparison, it may be noted that the control slots (401 and 402) (FIG. 4A) have a duration, in this example, of 100 ms.

The variable delay (302) functions, in part, to delay the voice envelope signal by a fixed predetermined amount. This fixed amount provides the communication unit (102) with sufficient time to peform the other functions described herein. For purposes of this explanation, it may be presumed that the fixed delay is 100 ms., and this delayed signal (408) can be seen in FIG. 4D.

The null detector (303) detects both the occurrence and duration of the first and second nulls (404 and 405). The null detector (303) provides this information to the delay control (304), which also receives information about contol slot transmission timing. The delay control (304) uses this information to control the variable delay (302) by deleting at least some of the nulls from the voice signal as finally transmitted (409). For example, in this particular embodiment, the first null (404) has been substantially eradicated from the transmitted signal, as denoted by the reference character 410. All but 20 ms of the second null (405) have been similarly deleted as denoted by the reference character 411.

So configured, the communication unit (102) functions to interrupt its own transmissions (409) from time to time by interrupting its own transmission control line (406) (FIG. 4C) in order to allow receipt of control slot information (412). These interruptions are 100 ms in length (since this embodiment presumes that the contol slots are each 100 ms in length). The communication unit (102) then uses detected nulls to regain the lost 100 ms. In the example depicted, the first null provided 40 ms of regained time, and the second null provided 60 ms (from the original 80 ms of null time).

Therefore, the communication unit (102) is able to occasionally receive TDM control slot information while simultaneously supporting an effective continuous transmission operating mode. In particular, none of the original voice information is lost, because interruptions to the transmission mode are made at the expense of nulls, which do not include any voice information.

We claim:

1. In an RF communication system having at least a first station and a second station, wherein the first station transmits information, including both message information and system control information, to the second station in a TDM format, and wherein the second station transmits information to the first station in a non-TDM format, a method of allowing the second station to monitor system control information transmitted by the first station, comprising the steps of:
   (a) when in a receive mode, receiving the system control information;
   (b) when in a transmit mode:
      (i) interrupting a transmission to the first station from time to time; and
      (ii) receiving the system control information as transmitted by the first station.

2. The method of claim 1 wherein the step of interrupting a transmission includes the steps of:
   b(i)(a) monitoring message information to be transmitted to the first station;
   b(i)(b) detecting occurrence of at least one predetermined message information event;
   b(i)(c) modifying the transmission in response to detection of at least some of the predetermined message event to allow interruption of the transmission and concurrent reception of the system control information without loss of message information.

* * * * *